United States Patent Office 2,721,196
Patented Oct. 18, 1955

2,721,196
BICYCLIC LACTAMS

John Clark Sheehan, Arlington, Mass., assignor to Bristol Laboratories Inc., Syracuse, N. Y., a corporation of New York No Drawing. Application January 5, 1953,
Serial No. 329,731

16 Claims. (Cl. 260—239.1)

This invention relates to compounds having bacteriostatic, bacteriocidal and fungistatic properties and the methods of their preparation. Some of these compounds are useful in the synthesis of penicillin. More particularly, this invention relates to new methods for the preparation of compounds containing the basic fused β-lactam-thiazolidine rings present in the β-lactam structure for penicillin. The compounds of the present invention are also useful as chemical intermediates for transformation into amino- and substituted-amino-2-thiazolidine-acetic acid β-lactams having bacteriostatic properties and substituents as indicated. This transformation is effected by rupture of one or two bonds between the carbonyl atoms and the exocyclic nitrogen atom, followed, if desired, by acylation, as with phenylacetic acid chloride. Compounds have been synthesized in which the combination of this ring system with an acylamino function alpha to the lactam carbonyl has been achieved for the first time. A striking feature of the present invention is that a compound has been prepared by a synthesis specifically designed to yield a β-lactam, which undergoes two typical and important penicillin reactions and possesses an infrared spectrum in the critical range almost identical to that of penicillin. This invention, therefore, constitutes the first chemical evidence from the synthetic side, for the β-lactam formulation of penicillin.

This application is a continuation-in-part of my prior, co-pending application, Serial No. 176,013 filed July 26, 1950, and now abandoned.

Very limited success has heretofore been attained in the synthesis of fused β-lactam-thiazolidine systems. The present invention represents a considerable advance in that this fused ring system in conjunction with the α-acylamine function has been attained, and for the first time such a synthetic structure has been shown to undergo chemical reactions typical to penicillin itself.

An extension of this reaction to the preparation of bicyclic β-lactams by the action of an acid chloride on a thiazoline (a cyclic imine) has resulted in the preparation of three fused β-lactams, all conforming to Structure I.

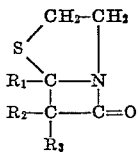
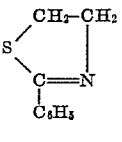
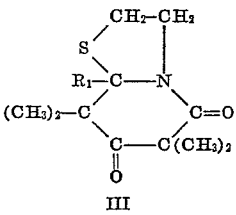

I     II     III

In only one case has a ketene been added directly to a thiazoline to form a β-lactam. Diphenyl ketene reacts with 2-phenyl-2-thiazoline (II) to give the β-lactam of 2,α,α-triphenyl-2-thiazolidineacetic acid (Ia, $R_1=R_2=R_3=C_6H_5$)

Dimethyl ketene reacts with 2-methyl-2-thiazoline and 2-phenyl-2-thiazoline to give the corresponding piperidinediones (see III), which are convertible to the β-lactams by partial hydrolysis followed by pyrolysis.

A large number of attempts have been made to synthesize penicillin-like structures, including the attempted reaction of ketenes with a variety of thiazolines. Much effort has been expended in attempts to add ketene itself to thiazolines. Several attempts made by different investigators led to no crystalline product and no other evidence of β-lactam formation.

There is now discovered according to the present invention a compound of the general formula

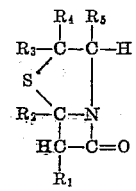

wherein $R_1$ represents a member selected from the group consisting of phthalimido, 3-nitrophthalimido, succinimido, and di(methanesulfonyl)amino; $R_2$ represents a member selected from the group consisting of hydrogen and phenyl; $R_3$ and $R_4$ each represents a member selected from the group consisting of lower alkyl and hydrogen and $R_3$ and $R_4$ are alike; and $R_5$ represents a member selected from the group consisting of hydrogen, carboxy and (lower)carbalkoxy.

The important results to be described are summarized in the following equations and discussion.

EQUATION 1

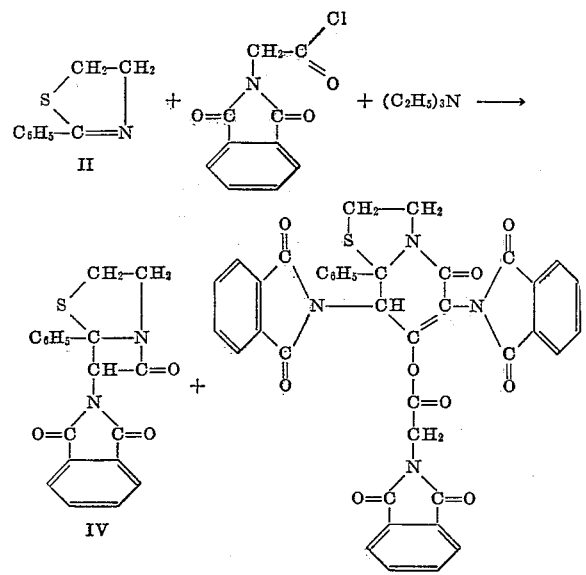

| | IV | V |
|---|---|---|
| Yields: | Percent | |
| Special high dilution conditions | 32 | Negligble. |
| Ordinary dilution | 5 | 45%. |

EQUATION 2

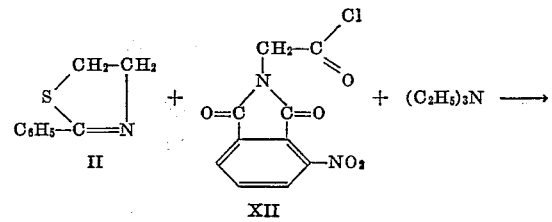

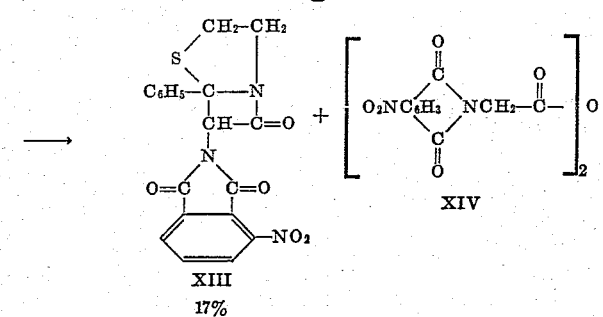
EQUATION 3
*Reactions of 2-phenyl-α-phthalimido-2-thiazolidinacetic acid β-lactam*
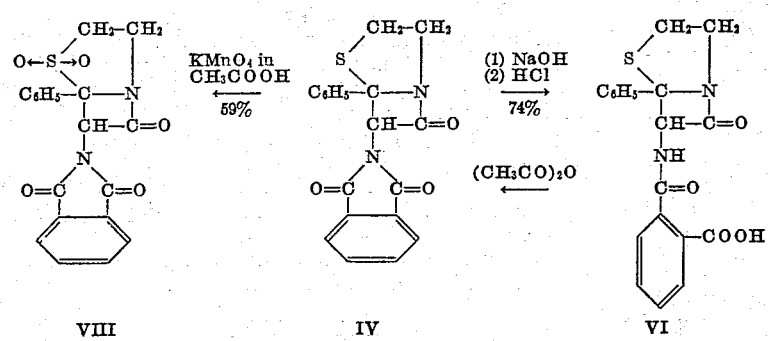
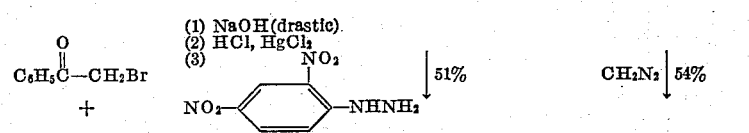
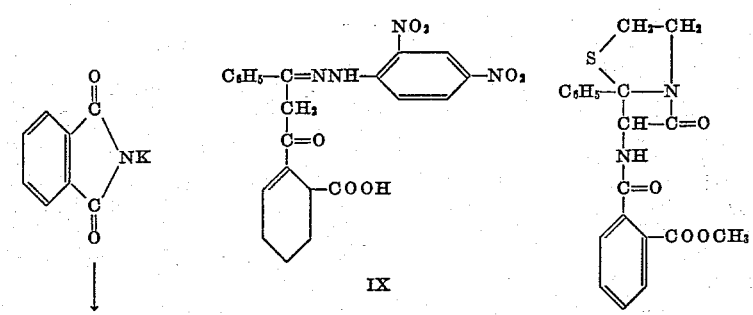
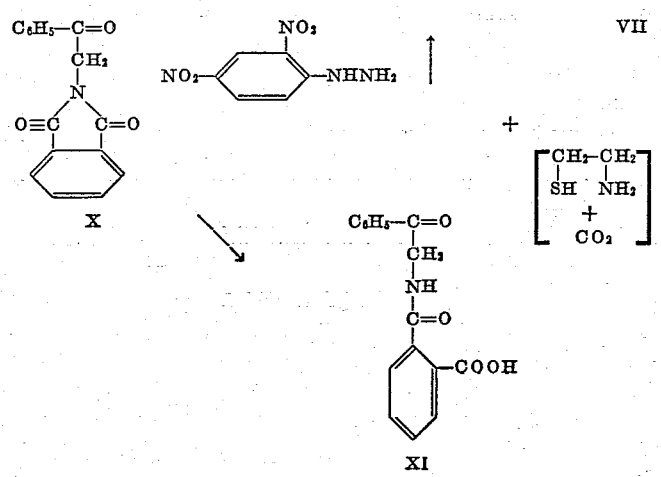

EQUATION 4

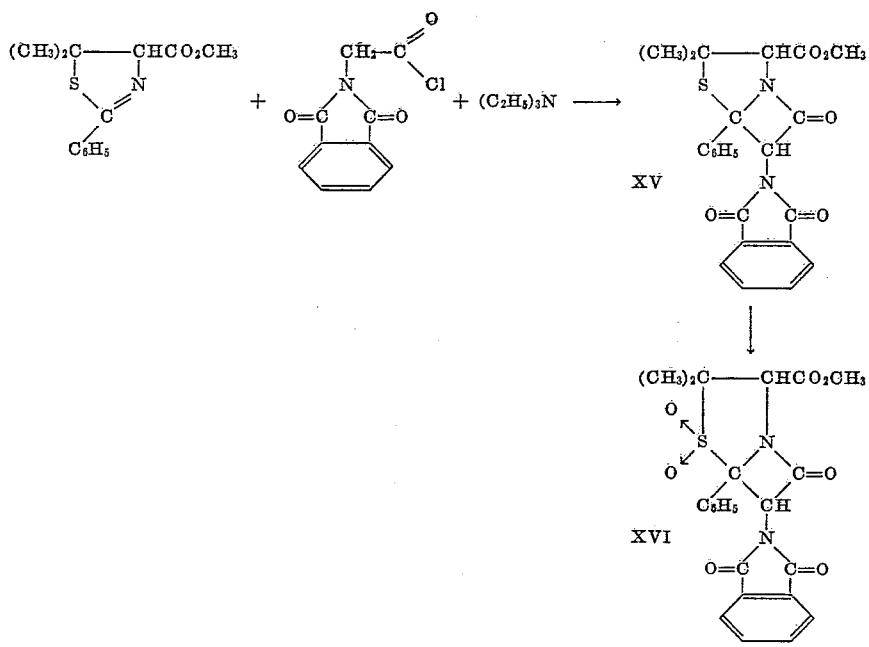

EQUATION 5

$C_6H_5-CH=NC_6H_5 +$
$(CH_3SO_2)_2NCH_2COCl + (C_2H_5)_3N \rightarrow$

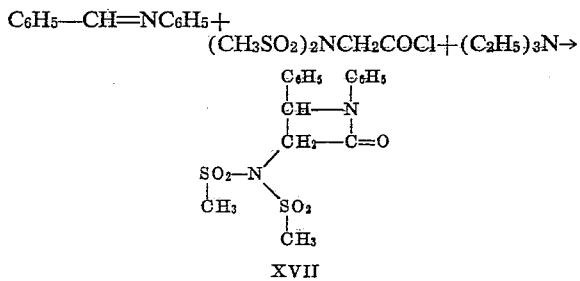

XVII

Phthalylglycyl chloride, triethylamine and 2-phenyl-2-thiazoline, in benzene solution, reacted to form the bicyclic lactam. The most successful application of this reaction depends upon the employment of the proper experimental conditions, especially the degree of dilution and order of addition of the reagents. A benzene solution of the acid chloride (one mole) was added, in a relatively short period of time, to a benzene solution of the imine (one and one-half moles) and triethylamine (one mole). There was formed an essentially quantitative yield of triethylammonium chloride, and approximately 45% of the ketene residue as a benzene insoluble product formed from three moles of the ketene and one of the thiazoline, whose analysis corresponded to structure V, of Equation 1. From the benzene filtrate the β-lactam was isolated along with 61% of unreacted thiazoline.

A high dilution technique was employed for optimum results [Cope, J. Amer. Chem. Soc., 72, 983 (1950)]. A solution of 2-phenyl-2-thiazoline and phthalylglycyl chloride in ether was prepared. The ether was maintained at rapid reflux and a solution of triethylamine in ether was added over an extended period (four hours) in such a way that each drop of solution was mixed with a large volume of returning ether condensate and thus entered the reaction flask in a highly diluted state. The thiazoline was therefore always in great excess with respect to the acid chloride. By this procedure, a good (31.5%) yield of the purified β-lactam (IV) was obtained. The theoretical amount of amine salt was isolated, but the amount of (V) formed was negligible. Recrystallization from aqueous-acetone and ethanol gave the pure β-lactam (M. P. 215–216.5°).

The present application of the high dilution technique, providing for a dimolecular at the expense of a termolecular reaction (and involving two different compounds) is a unique departure from the conventional use of the method, in which intramolecular reaction is favored over polymerization.

Evidence for the structure of the β-lactam (IV) was obtained by oxidation to the corresponding sulfone (VIII). The action of potassium permanganate of the lactam (IV) in dioxane:acetic acid:water (10:3:1) afforded the sulfone (VIII) in 59% yield, obtained as colorless cubic crystals, melting at 225°. One of the strong arguments supporting the β-lactam structure of penicillin is the oxidation of methyl benzylpenicillinate to the sulfone. It is known that N-acylthiazolidines give sulfones on oxidation, although the corresponding thiazolidines without an N-acyl group on similar oxidation give products which result from cleavage of the thiazolidine ring. Other work, such as the oxidation of dimethyl N-benzoyl-D,L-benzylpenicilloate to the corresponding sulfone, in addition to older evidence of the inherent instability of the D-α-amino sulfone structure, warranted the formulation of penicillin as an N-acylated thiazolidine.

The present invention is the first instance of the formation of a sulfone from a synthetic fused β-lactam-thiazolidine compound. Attempts to so oxidize two of the lactams obtained by the Shell group failed.

Alkaline hydrolysis of the lactam (IV) by treatment with one mole of dilute sodium hydroxide for twenty minutes gave 2-phenyl-α-(o-carboxybenzamide) - 2 - thiazolidineacetic acid β-lactam in 75% yield, obtained as fine needles melting at 137.5–139.5° (dec.). Since the susceptibility of this β-lactam linkage to hydrolysis was unknown there was some doubt as to whether the lactam bond or the phthalimide group had been opened. It is known that the phthalyl group is extremely sensitive to alkali. Proof that the phthalyl group was the point of attack was provided by the successful reclosure of the acid to the original lactam (IV) by use of acetic anhydride. The easy elimination of water by such o-carboxy-benzamides, even by simply heating above the melting point is well-known. Moreover, many attempts during the penicillin synthesis program to reactivate β-penicilloates using a wide variety of dehydrating agents, including acetic anhydride, all failed.

The acid (VI) was converted to its methyl ester (VII), (M. P. 148–149°), in 54% yield by the use of diazomethane. This compound and its parent acid are the closest synthetic analogues of penicillin thus far reported.

The corresponding 3-nitrophthalimido-β-lactam was synthesized (Equation 2). The comparative method was similar to that used for the unsubstituted lactam. The yield was 17% as colorless rectangular prisms, melting at 210°–211° (dec.).

Determination of the infrared spectrum of the lactam methyl ester (VII, Figure 1 of the attached drawings) together with that of the parent lactam (IV, Figure 2) and a comparison of these with the spectrum of methyl benzylpenicillinate (Figure 3) provides strong proof of the close structural similarity of the ester (VII) with penicillin.

Penicillin shows a strong band at 1780 cm.$^{-1}$. This was early assigned to the lactam carbonyl on the basis of theoretical arguments. The lactam carbonyl is shifted in monocyclic lactams to the value of 1740 cm.$^{-1}$, a change indicative of greater double-bond character of the C=O bond as a result of the dampening of normal amide resonance by the four-membered ring. Since X-ray crystallography of penicillin has confirmed that the two fused rings are not coplanar the probability of amide resonance to the dipolar form is even less in the bicyclic lactam. It is not surprising therefore to find the lactam carbonyl in penicillin absorbing at 1780 cm.$^{-1}$, close to the range of the pure carbonyl group. Later, when the spectra of the synthetic β-lactams were determined, they also were found to show strong bands at this same value. In our determination of methyl benzylpenicillinate, the lactam carbonyl absorbs at 1785 cm.$^{-1}$; the lactam carbonyl band of the synthetic compound is at 1777 cm.$^{-1}$. The carbomethoxyl group in penicillin absorbs at 1748 cm.$^{-1}$; we assign the band at 1724 cm.$^{-1}$ of the synthetic sample to the carbomethoxyl. In penicillin the bands at 1677 and 1507 cm.$^{-1}$ are attributed to the monosubstituted amide group; the synthetic compound absorbs at 1678 and 1507 cm.$^{-1}$, and we assign these bands also to the monosubstituted amide group. Both curves show weak bands at 1600 cm.$^{-1}$ and these are attributed to the phenyl groups.

The infrared spectrum of the phthalimido lactam (IV) discloses a broad band at 1784 cm.$^{-1}$. The spectrum of N,N-diethyl phthalylglycyl amide shows that it possesses a band at 1725 cm.$^{-1}$ and a strong, but narrow, band at 1776 cm.$^{-1}$, both of which we assign to the phthalimide carbonyl groups. We therefore consider that the broad band at 1784 cm.$^{-1}$ for the phthalimidolactam is due to a combination of the β-lactam and the narrow phthalimide band. When this compound is converted to the corresponding ester this band is narrowed to the magnitude expected for the β-lactam carbonyl. The phthalimido lactam shows no strong absorption at 1507 cm.$^{-1}$ and this is as expected since that band is characteristic of monosubstituted amides and does not appear until the compound is esterified.

The following examples will better serve to illustrate the invention without limiting it thereto. All temperatures in this application are in degrees centigrade.

Example I 2-phenyl-o-phthalimido-2-thiazolidineacetic acid β-lactam (IV)-high dilution A solution of 4.48 g. (0.0200 mole) of phthalylglycyl chloride and 3.36 g. (0.0200 mole) of 2-phenyl-2-thiazoline in 75 ml. of ether was placed in a 200 ml. three-neck flask bearing a mercury-seal stirrer and a small high-dilution addition tube (which carried, in turn, an efficient reflux condenser and a dropping funnel). Some flocculent white precipitate was formed, probably a result of slightly impure reactants, and represented only a small portion of the materials. The addition tube was filled with ether before starting. The flask was heated by a Glas-cel heater at such a rate that a very rapid reflux through the dilution tube was maintained. A solution of 2.77 ml. (2.02 g., 0.0200 mole) of triethylamine in 40 ml. of ether was then added over a four hour period.

The solid was collected by filtration onto a small, tared Büchner funnel, washed with ether, dried at 70° and weighed, then washed with water, redried at 70° and weighed. The loss in weight was 2.54 g., equivalent to 93% of the theoretical yield of amine hydrochloride. The residue weighed 5.64 g., tan solid M. P. 160–195°. The ether solution was concentrated to dryness to give a small amount of oily material which resembled the starting thiazoline.

The main reaction residue was digested with 2 x 20 ml. portions of ether, which removed some oily material but not much color. The residue was then digested with 75 ml. of boiling ethanol (95%) and filtered hot. The residue was the lactam (IV); weight 2.20 g. (31.5%), white powder, M. P. 203–213°. This material was sufficiently pure for use in subsequent preparations. The impurities to be removed were absorbed thiazoline and the more insoluble triketene compound (V).

A sample of 0.200 g. was recrystallized four times by dissolving in 10 ml. of acetone, filtering to remove a little insoluble residue, and adding 1 ml. of water. This afforded a crop of fine long rectangular prisms; weight 0.100 g.; M. P. 213.5–215° (dec.). A final purification by recrystallization of 0.125 g. of material from 15 ml. of boiling ethanol (95%) afforded 0.070 g. of the colorless prisms; M. P. 215–216.5° (with evolution of gas, to a brown liquid).

Analysis.—Calculated for $C_{19}H_{14}N_2O_3S$:

|   | Calculated | Found |
| --- | --- | --- |
| C | 65.13 | 65.07 |
| H | 4.03 | 4.12 |
| N | 8.00 | 7.90 |
| S | 9.15 | 9.14 |

The lactam (IV) is insoluble in water; moderately soluble in acetone, ethanol and benzene; somewhat more soluble in dioxane. It gives a negative sulfhydryl test and does not react with mercuric chloride in ethanol-ether.

Other conditions.—In a run involving direct mixing of the three reactants 1.0 g. (0.00614 mole) of the phenyl thiazoline (II) and 1.375 g. (00.00614 mole) of phthalylglycyl chloride were mixed in a test-tube. Warming to 70° gave a clear solution. Triethylamine, 0.85 ml. (0.62 g., 0.00614 mole) was then added and there was an immediate, vigorous reaction during which the mixture changed to yellow gelatinous paste. After thorough stirring the mixture was diluted with 20 ml. of benzene and filtered. The solid was washed with benzene, dried, washed with water and again dried. The loss in weight was equivalent to 96% of a quantitative yield of amine hydrochloride. The residue weighed 0.69 g.

Concentration of the benzene filtrate under reduced pressure afforded an orange syrup which was triturated with acetone to yield a small crop of crystals. Collection and washing with acetone yielded the lactam (IV); weight 0.24 g. (11%); M. P. 208–211° (s. 206°).

A double high dilution run gave good results. The thiazoline, in ether solution, was placed in the reaction flask and other solutions of the amine and acid chloride were added simultaneously through separate addition tubes. The yield was 27% of the lactam (IV).

EXAMPLE II

Sulfone of 2-phenyl-α-phthalimido-2-thiazolidine-acetic acid β-lactam (VIII)

A solution of potassium permanganate (0.34 g.) in a mixture of 10 ml. of glacial acetic acid and 3 ml. of water was added to a solution of 0.28 g. (0.0080 mole) of the phthalimidolactam (IV) in 30 ml. of purified dioxane. The mixture was kept at room temperature for one hour with occasional shaking, during which time the permanganate color gradually gave way to a brown precipitate. Sulfurous acid (6% solution) was then added until the color was discharged (approx. 11 ml.). After filtration to remove a small amount of black insoluble material the solution was diluted with 40 ml. of water. In a few minutes crystallization commenced and after two hours the crop was collected, washed with water and dried at 70°; yield 0.18 g. (59%) M. P. 215–220° (charring). For purification the whole amount was dissolved in 15 ml. of boiling dioxane, filtered and diluted with water. Filtration afforded the sulfone (VIII) as colorless cubic crystals; weight 0.16 g.; M. P. 225° (darkening at 215°).

Analysis.—Calculated for $C_{19}H_{14}N_2O_5S$ (382.4):

|   | Calculated | Found |
|---|---|---|
| C | 59.67 | 59.66 |
| H | 3.69 | 3.71 |
| N | 7.34 | 7.35 |

EXAMPLE III

α-(α-Carboxybenzamide)-2-phenyl-2-thiazolidine - acetic acid β-lactam (VI)

A solution of 0.350 g. (0.00100 mole) of the phthalimidolactam (IV) in 10 ml. of warm dioxane was carefully cooled to room temperature and 10.4 ml. of 0.0970 N sodium hydroxide (0.00100 mole) solution added. A yellow color developed immediately and a light flocculent precipitate formed. The pH was approximately 8 after one minute, 6 after ten minutes, and appeared to be constant at 6 after twenty minutes. Filtration and addition of 10 ml. of 0.10 N hydrochloric acid caused disappearance of the yellow color and formation of a white precipitate. The mixture was diluted with 20 ml. of water and after ten minutes the solid was collected by filtration and air-dried; yield 0.27 g. (74%); M. P. 131.5–133.5° (dec., s. 130°); negative sulfhydryl test. Recrystallization by dissolving 0.100 g. in a mixture of 4 ml. of acetone-dioxane (3:1) and adding 3 ml. of water afforded the lactam-acid (VI) as fine, colorless needles; weight, 0.075 g.; M. P. 137.5–139.5° (to a red liquid). A second recrystallization gave essentially the same melting point which appeared to depend somewhat upon the rate of heating.

Analysis.—Calculated for $C_{19}H_{16}N_2SO_4$:

|   | Calculated | Found |
|---|---|---|
| C | 61.98 | 61.66 |
| H | 4.38 | 4.56 |
| N | 7.65 | 7.37 |
| Neut. Equiv | 368 | 357 |

A sample of the lactam-acid (VI) later prepared melted at 141–142° (dec.).

*Reclosure of the phthalimide ring with acetic anhydride. Preparation of the phthalimidolactam (IV) from the lactam-acid (VI)*

Twenty-five milligrams of the lactam acid (VI) was boiled for ten minutes (boiling for one minute was found to be inadequate) with 0.25 ml. of acetic anhydride. After cooling to room temperature the excess anhydride was decomposed by shaking with 1 ml. of water. A white crystalline precipitate was separated by centrifugation, and decantation of the liquor. The residue was recrystallized by dissolving in 0.25 ml. of acetone and adding 0.5 ml. of water, to afford a crop of needle-shaped crystals; M. P. 210–213° (dec., evolution of gas). The melting point of a mixture with an authentic sample of the phthalimidolactam (IV) (M. P. 213.5–215°) was 212–215°.

EXAMPLE IV

α-(o-Carbomethoxy)-2-phenyl-2-thiazolidine - acetic acid β-lactam (VII)

Two milliliters of an 0.7 N ethereal diazomethane solution was added to 0.10 g. of the lactam-acid (VI) suspended in a mixture of 5 ml. of ether and 5 ml. of chloroform. The solid immediately dissolved and gas was evolved. Evaporation of the solvent under reduced pressure afforded a white fluffy powder. This was leached with 15 ml. of anhydrous ether and the ether solution filtered to remove some insoluble material (approximately 30%). Concentration of the filtrate to 5 ml. and addition of 5 ml. of pentane afforded the product; yield 0.055 g. (53%); M. P. 141–142.5°. Recrystallization by dissolving in a mixture of 1 ml. of ether and 2 ml. of chloroform followed by dilution with 4 ml. of pentane yielded the ester (VII) as fine, colorless, rectangular prisms; weight 0.030 g.; M. P. 148–149° (s. 147°) (depressed on admixture with the acid (VI)).

Analysis.—Calculated for $C_{20}H_{18}N_2O_4S$ (382.4):

|   | Calculated | Found |
|---|---|---|
| C | 62.82 | 63.20 |
| H | 4.74 | 4.93 |
| N | 7.33 | 7.26 |

EXAMPLE V

α-(3-nitrophthalimido)-2-phenyl - 2 - thiazolidine - acetic acid β-lactam (XIII)

A three-neck, 200 ml. flask was fitted with a mercury-seal stirrer, (XIII) a stopper bearing a thermometer, and a high-dilution addition tube. In the flask was placed a solution of 2.67 g. (0.0100 mole) of 3-nitrophthalylglycyl chloride (XII) in 60 ml. of dry benzene and 40 ml. of dry ether (the low solubility of the chloride necessitated the use of benzene). 2-phenyl-2-thiazoline (1.63 g.; 0.0100 mole) was then added. The stirrer was started and heating begun until there was a rapid stream of condensate back through the addition tube. A solution of 1.40 ml. (1.01 g., 0.0100 mole) of triethylamine in 40 ml. of ether was added in the course of forty-five minutes. The thermometer read 62° at the start and 58° at the end. The mixture was stirred for fifteen minutes at reflux temperature and then for forty-five minutes while cooling to room temperature. The solid product was then filtered, washed with ether, and dried, leached with water, filtered, spread on a dish and air-dried. The loss in weight was 1.18 g., equivalent to 86% of the theoretical yield of triethylammonium chloride. The residue weighed 1.04 g., M. P. 180–220°.

The product (XIII) was recovered from the benzene-ether filtrate. After standing this deposited a crop of solid which was recrystallized from 60 ml. of 1:1 acetone-pentane to give 0.19 g. of material of melting point 182–200°. The benzene-ether solution which had been decanted off was diluted with ether until precipitation was complete. The precipitate was a yellow orange gum. After removing the supernatant liquor the gum was washed with a little acetone to absorb most of the color. The liquors were combined. On boiling the residue with 10 ml. of acetone only a part was dissolved and a white residue remained. The acetone was decanted and 10 ml. of pentane added to precipitate a yellow crop which was filtered off. The weight was 0.32 g.; M. P. 203–206° (dec., s. 195°). The residue from the acetone treatment was dissolved in 30 ml. of acetone and 30 ml. of water added to precipitate a crop of fine rectangular prisms (the nitrolactam (XIII); weight 0.060 g.; M. P. 210–211° (evolution of gas and charring). Recrystallization from aqueous acetone did not change the melting point.

Analysis.—Calculated for $C_{19}H_{13}N_3O_5S$ (394.5):

|   | Calculated | Found |
|---|---|---|
| C | 57.72 | 57.75 |
| H | 3.31 | 3.44 |
| N | 10.63 | 10.60 |

The yield of pure and semi-pure material was thus 0.06+0.32 g.=0.38 g.

The 1.04 g. of insoluble residue from the main reaction mixture is considered to be 3-nitrophthalylglycylanhydride. Solution of 0.200 g. of this product is 12 ml. of acetone, followed by addition of 12 ml. of pentane, produced a yellow powder; weight 0.10 g.; M. P. 220–225° (dec., evolution of gas, s. 210°). This solution in 12 ml. of acetone and addition of ml. of pentane afforded a crop of colorless, rectangular prisms; weight 0.500 g.; M. P. 237–238° (evolution of gas, s. 236°).

Analysis.—Calculated for $C_{20}H_{10}N_4O_{11}$ (482.3):

|   | Calculated | Found |
|---|---|---|
| C | 49.80 | 49.99 |
| H | 2.09 | 2.04 |
| N | 11.61 | 11.71 |

EXAMPLE VI
*4-thia-1-azabicyclo 3,2,0-2-heptanecarboxylic acid, 3,3-dimethyl-7-oxo-5-phenyl-6-phthalimido-,methyl ester (XV)*

In a 200 ml. three-necked flask was placed 2.39 g. (0.01 mole) of methyl 5,5-dimethyl-2-phenyl-2-thiazoline-4-carboxylate in 50 ml. of dry ether and 2.24 g. (0.01 mole) of phthalimido-acetyl chloride in 50 ml. of dry ether was added through a Ziegler high-dilution cycle over a period of two hours.

The reaction mixture was filtered from the precipitate, and the ether filtrate was concentrated to about 25 ml. and again filtered from the precipitate. On standing overnight, this ether filtrate deposited blunt, colorless needles which were covered with a yellow, somewhat gummy powder. (The mother-liquor, on addition of picric acid, yielded picrate of some of the unreacted starting thiazoline, M. P. 105–106°). The above crude product, the yellow, gummy powder, weighed 220 mg., M. P. ca. 190°. It was recrystallized from an acetone-ligroin mixture; M. P. 177–179°.

Analysis.—Calculated for $C_{23}H_{20}N_2O_5S$:

|   | Calculated | Found |
|---|---|---|
| C | 63.29 | 63.35 |
| H | 4.62 | 4.74 |
| N | 6.42 | 6.44 |

EXAMPLE VII
*4-thia-1-azabicyclo 3,2,0-2-heptanecarboxylic acid, 3,3-dimethyl-7-oxo-5-phenyl-6-phthalimido-,methyl ester, 4-dioxide (XVI)*

100 mg. of the preceding compound was dissolved with warming in 6 ml. of 80% acetic acid. With warming, 250 mg. of potassium permanganate was dissolved in 3 ml. of water. The solution of compound in acetic acid was added to the permanganate solution, and the reaction mixture was allowed to stand for twenty minutes. The reaction mixture was then decolorized with several drops of 35% hydrogen peroxide. The white, somewhat cloudy suspension was further diluted with 15 ml. of water, the sulfone floating to the surface as a fleecy mass. Under the microscope the material was highly crystalline. It was filtered off, washed with water, and dried in vacuo; yield, 100 mg. (93%), M. P. 243–244°

The above crude product was dissolved in a mixture of 5 ml. of methanol and 5 ml. of acetone by warming. After filtering from a slight cloudiness, 2 ml. of water was added. On cooling, flat plates precipitated from the solution; yield, 65 mg., M. P. 251–254°. The mother-liquor yielded a further 15 mg. of product, M. P. 251–254°; (combined yield, 80 mg. (75%)).

Analysis.—Calculated for $C_{23}H_{20}N_2O_7S$:

|   | Calculated | Found |
|---|---|---|
| C | 58.96 | 59.30 |
| H | 4.30 | 4.39 |
| N | 5.98 | 5.90 |
| S | 6.84 | 6.70 |

EXAMPLE VIII
*1,4-diphenyl-3-(N,N-dimethanesulfonylamino)-2-azetidinone (XVII)*

To a stirred solution of 3.00 g. (0.0166 mole) of benzalaniline and 1.11 ml. (0.81g., 0.00800 mole) of triethylamine in 15 ml. of benzene was added dropwise a solution of 2.00 g. (0.00800 mole) of dimethanesulfonyl-aminoacetyl chloride in 50 ml. of benzene (the addition required twenty minutes). A white precipitate began to form at once and at the end the mixture was so viscous that stirring had to be done manually with a heavy rod. This stirring was continued intermittently for thirty minutes and the insoluble material was then filtered off onto a small, tared Büchner funnel, washed with benzene and dried at 70°. The dry product was washed by slurrying with water, refiltered and redried. The loss in weight was 1.05 g., equivalent to 96% of the theoretical yield of amine hydrochloride. The residue weighed 1.56 g.; M. P. 187–200° (dec.), negative chlorine test (Beilstein's copper wire). This residue was dissolved in 70 ml. of boiling acetone and filtered to remove 0.3 g. of insoluble material, which was not investigated. Addition of 20 ml. of water afforded colorless crystals; weight 0.77 g.; M. P. 235–236.5° (dec., sintering at 233°). By concentration of the main benzene filtrate to 5 ml. of seeding, additional product was obtained (colorless needles); weight 0.45 g.; M. P. 235–236.5°. The total yield was 1.22 g. (39%). Recrystallization of 0.45 g. from 40 ml. of acetone and 20 ml. of water gave the product as fine needles; weight 0.40 g., M. P. 235.5–236.5° (no dec.).

Analysis.—Calculated for $C_{17}H_{18}N_2O_5S_2$ (394.4):

|   | Calculated | Found |
|---|---|---|
| C | 51.77 | 51.65 |
| H | 4.60 | 4.72 |
| N | 7.11 | 7.07 |

EQUATION 6

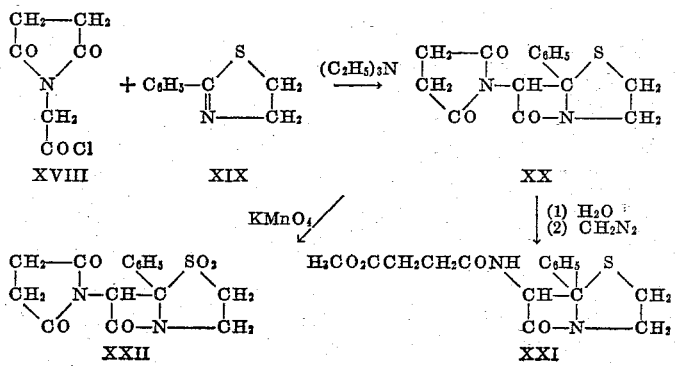

EQUATION 7

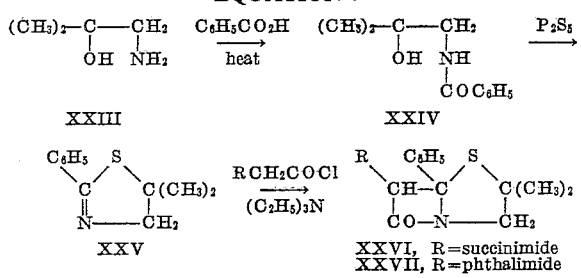

EQUATION 8

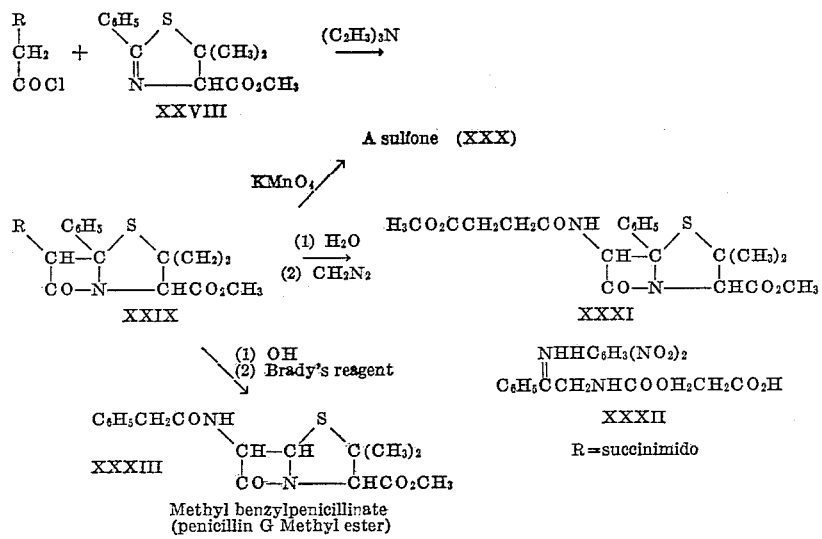

The simplest lactam (XX) prepared in this work was obtained by interaction of 2-phenyl-2-thiazoline (XIX) and succinimidoacetyl chloride (XVIII). The reaction showed even greater sensitivity to conditions than the analogous procedure in the case of phthaloylglycyl chloride, and the standard method previously used (high dilution addition of triethylamine in ether to a mixture of thiazoline and acid chloride in refluxing ether) yielded no isolable lactam. A similar procedure using refluxing benzene resulted in a 14% yield of the adduct XX, but the isolation was very difficult. The most successful preparation, involving the use of methylene chloride as a solvent under high dilution conditions, yielded 56% of the desired lactam XX directly in easily purified state from the crude reaction mixture. The use of the latter procedure has proved successful repeatedly in the similar preparations to be described, several of which failed to yield appreciable amounts of lactam when carried out in other solvents.

The structure of the lactam XX was readily assigned on the basis of oxidation to the sulfone XXII and infrared spectrum.

The spectrum of XX shows the characteristic strong band at $5.6\mu$ due to $\beta$-lactam carbonyl stretching in addition to the succinimido carbonyl band at $5.8\mu$. The characteristically very weak band of the succinimido groups at $5.6\mu$ coincides with the $\beta$-lactam band.

The oxidation of the lactam XX to the corresponding sulfone XXII in quantitative yield using potassium permanganate in acetic acid-dioxane-water was carried out under conditions known to lead to high yields of the sulfone of methyl benzylpencillinate.

Hydrolysis of the succinimido protecting group proceeded readily on slow titration of a dioxane solution with 0.1 N base. The corresponding methyl ester XXI was prepared, using diazomethane, in 67% overall yield. The infrared spectrum of this lactam shows clearly the characteristic lactam band at $5.65\mu$, primary amide bands at $2.92\mu$, $5.93\mu$ and $6.60\mu$ and the ester carbonyl at $5.80\mu$. It is interesting to note that the high wavelength band of the primary amide falls at $6.6\mu$ as in penicillin, rather than at the lower wavelength usually observed with primary amides (near $6.5\mu$).

The preparation of a similar series of compounds which possess the 5,5-geminal dimethyl grouping characteristic of penicillin was also carired out. Condensation of benzoic acid and isobutanolamine (XXIII) yielded the amide XXIV in 76% yield, which was cyclized by reaction with phosphorus pentasulfide to yield 41% of the thiazoline XXV. The reaction of XXV with succinimidoacetyl chloride and triethylamine 16% of the desired lactam XXVI. A similar reaction with phthalimidoacetyl chloride in ether yielded the corresponding phthalimido lactam XXVII in only 5% yield.

Starting material for the preparation of members of the $\beta$-lactam-thiazolidine series related to 5-phenylpenicillin itself was methyl 2-phenyl-5,5-dimethyl-2-thiazoline-4-carboxylate (XXVIII), obtained from natural penicillamine by esterification followed by ring formation with ethyl-benzimidate. Under the conditions of this particular preparation, which involved evaporative distillation at 150°, the product was apparently completely recemized. Reaction of the thiazoline XXVIII with succinimidoacetyl chloride under high-dilution conditions yielded 13% of the desired lactam XXIX, which was readily oxidized to the sulfone XXX in 76% yield. The infrared spectrum of XXIX shows the characteristic ester band at $5.7\mu$ in addition to the expected $5.6\mu$ lactam and $5.8\mu$ succinimido bands. Alkaline degradation of XXIX led to N-phenylsuccinamic acid, isolated as the 2,4-dinitrophenylhydrazone.

Hydrolysis and esterification of XXIX affords a 29% yield of the corresponding $\alpha$-acylamino derivatives XXXI, which has an infrared spectrum similar to that of natural methyl benzylpenicillinate itself (XXXIII). Disappearance of the strong $5.8\mu$ band of the succinimido group reveals the $5.8\mu$ ester which is thus shown to be due to the side-chain carbomethoxy group. Compound XXXI, methyl 5-phenyl-$\beta$-carbomethoxyethyl penicillinate, is a synthetic analog of penicillin.

EXAMPLE IX

*Succinimidoacetic acid.*—A well pulverized mixture of succinic anhydride (50.0 g., 0.5 mole) and glycine (37.6 g., 0.5 mole) was evacuated to 0.5 mm. and then heated in an oil bath at 100°. After warming slowly to 150°, the mixture was maintained at 160° for two hours. On cooling, the melt solidified to a brown cake, which was dissolved in 200 ml. of boiling ethyl acetate and decolorized with Norit. The crude product separated at 50.4 g. (60%) of colorless needles, M. P. 105–116°.

This product gave the same results in the preparation of XVIII as a portion recrystallized from ethyl acetate, M. P. 117°–120°. Scheiber and Beckleben report the melting point at 113°.

EXAMPLE X

*Succinimidoacetyl chloride*

A mixture of succinimidoacetic acid (7.0 g., 0.0416 mole) and phosphorus pentachloride (8.68 g., 0.0416 mole) in a flask protected by a calcium chloride tube was allowed to fuse at room temperature. Benzene (50 ml.) was added and the mixture was allowed to stand for ninety minutes at 30°, followed by a thirty minute period of heating under reflux. The filtered benzene solution was concentrated at 30 mm. and 50°, then three successive 25 ml. portions of toluene were added and distilled. The oily residue of XVIII set to a hard, cream-colored solid on cooling, weight 7.1 g. (92%), M. P. 68–80°. Recrystallization failed to improve the melting point, but conversion to the corresponding anilide indicated a purity of not less than 76%. The literature value of the melting point is 76°.

The anilide was prepared from 0.46 g. (0.0025 mole) of XVIII in 25 ml. of methylene chloride by addition of 0.465 g. (0.455 ml., 0.005 mole) of aniline in methylene chloride at 0°. The yield of water-washed product was 0.44 g. (76%), M. P. 151.5–152.5°. An analytical sample was recrystallized from acetone-cyclohexane, M. P. 152.5–154.0°.

*Analysis.*—Calculated for $C_{12}H_{12}N_2O_3$:

|   | Calculated | Found |
|---|---|---|
| C | 62.06 | 61.95 |
| H | 5.21 | 5.20 |
| N | 12.07 | 12.06 |

The diethylamide was prepared from 0.556 g. (0.003 mole) of XVIII by an analogous procedure. The yield of pure product obtained by evaporative distillation was 0.300g. (47%) M. P. 66.0–67.5°.

*Analysis.*—Calculated for $C_{10}H_{16}N_2O_3$:

|   | Calculated | Found |
|---|---|---|
| N | 13.20 | N. 12.88 |

EXAMPLE XI

*2-phenyl-α-succinimido-2-thiazolidinoacetic acid β-lactam (XX)*

A. *High dilution in methylene chloride*

To a solution of 1.63 g. (0.01 mole) of 2-phenyl-2-thiazoline (XIX) in 10 ml. of methylene chloride (dried over calcium sulfate) in a 200-ml. three-necked flask was added 1.85 g. (0.01 mole) of succinimidoacetyl chloride (XVIII) in 25 ml. of methylene chloride. To this rapidly stirred solution at reflux was added through a high-dilution cycle a solution of 1.02 g. (0.01 mole) of triethylamine in 50 ml. of methylene chloride over a six hour period. The resulting amber solution was concentrated to a brown magma, which was shaken with 50 ml. of benzene and filtered. The white crystalline residue amounted to 1.50 g., or slightly more than the theoretical amount of trimethylamine hydrochloride. The filtrate was concentrated to a brown oil which partially crystallized on standing several days under reduced pressure. The soft solid was triturated with 20 ml. of 50% aqueous ethanol and was stored overnight. On filtration, the crude lactam XX was obtained as 1.70 g. (50%) of crisp, yellow needles, M. P. 148–160°. A 1.3 g. portion was taken up in 7 ml. of dioxane, 25 ml. of water and decolorized by boiling with Norit. On slow cooling, pure XX was obtained as 0.600 g. (30%) of rectangular platelets, M. P. 166.0–168.5°. An analytical sample recrystallized from acetone-petroleum ether melted at 169.0–170.0°.

*Analysis.*—Calculated for $C_{15}H_{14}N_2O_3S$:

|   | Calculated | Found |
|---|---|---|
| C | 59.58 | 59.44 |
| H | 4.67 | 4.66 |
| N | 9.27 | 9.55 |

B. *High dilution in benzene*

To a 50-ml. benzene solution of 4.08 g. (0.025 mole) of 2-phenyl-2-thiazoline (XIX) and 4.64 g. (0.025 mole) of succinimidoacetyl chloride (XVIII) was added through a high-dilution cycle 3.51 ml. (2.56 g., 0.025 mole) of triethylamine in 50 ml. of benzene over a four-hour period. The precipitated triethylamine hydrochloride (3.43 g., 99%) was collected by filtration and the filtrate was concentrated at reduced pressure to a brown oil. On trituration of the residue with three 30-ml. portions of ether, 5.87 g. of orange-yellow, crisp powder was obtained in largely amorphous form, M. P. 140–155°. A 1.0 g. portion of the powdery residue was extracted in a Soxhlet apparatus with 100 ml. of ether for fifteen hours. A crystalline fraction filtered from the extract amounted to 0.365 g. (28%) of crude lactam XX, M. P. 155.5–160.0°. The melting point of a portion recrystallized from acetone-ether was 160.0–162.0°. On admixture with an authentic sample, the melting point was undepressed.

Partially purified XX could also be obtained from the crude reaction mixture by evaporative distillation. A 0.250 g. portion distilled at $15\mu$ pressure and 140–160° yielded 0.050 g. (15.4% overall) of small prisms of XX, M. P. 155.0–159.0°.

EXAMPLE XII

*Sulfone of 2-phenyl-α-succinimido-2-thiazolidineacetic acid β-lactam (XXIX)*

To a solution of 0.242 g. (0.0008 mole) of XX in 30 ml. of dioxane was added 0.34 g. of potassium permanganate in 3 ml. of water and 10 ml. of acetic acid. After forty minutes, the brown solution was decolorized with several drops of 30% hydrogen peroxide solution and then diluted with 80 ml. of water. After standing at 5° overnight, the crystalline precipitate was collected by filtration, weight 0.270 g. (100%), M. P. 187.5° (dec.). An analytical sample obtained as short colorless rods from dioxane-cyclohexane containing a few drops of acetic anhydride melted at 186.8–187.0° (dec.).

*Analysis.*—calculated for $C_{15}H_{14}N_2O_5S$:

|   | Calculated | Found |
|---|---|---|
| C | 53.88 | 53.92 |
| H | 4.22 | 4.41 |
| N | 8.38 | 8.00 |

EXAMPLE XIII

*2-phenyl-2-(2-carbomethoxypropionylamino)-2-thiozolidineacetic acid and β-lactam (XXI)*

To a solution of 0.500 g. (0.00165 mole) of XX in 15 ml. of dioxane was added 17.0 ml. of 0.097 N sodium hydroxide solution. After one hour, 15.9 ml. of 0.104 N hydrochloric acid was added and the resulting solution was concentrated to dryness under reduced pressure. The organic portion of the residue was taken up in 20 ml. of chloroform, and dried by shaking with anhydrous magnesium sulfate for several minutes. To the filtered chloroform solution was added an excess (10 ml. of 0.32 N) of diazomethane in ether. After twenty minutes, several drops of acetic acid were added and the solution was concentrated to dryness under reduced pressure. The oil was dissolved in acetone and precipitated by the addition of petroleum ether as 0.370 (67%) of colorless needles (XXI), M. P. 109.5–113.5°. The crude product was dissolved in 5 ml. of dioxane and diluted with 5 ml. of cyclohexane. After removal of a trace of insoluble material, further dilution with 25 ml. of cyclohexane yielded 0.230 g. (41.6%), M. P. 116.8–117.8°. An analytical sample of XXI, M. P. 119.5–120.5°, was obtained on recrystallization first from acetone-petroleum ether, and then from benzene-cyclohexane.

Analysis.—Calculated for $C_{16}H_{18}N_2O_4S$:

|   | Calculated | Found |
|---|---|---|
| C | 57.47 | 57.52 |
| H | 5.42 | 5.85 |
| N | 8.38 | 8.38 |

EXAMPLE XIV

N-(2-hydroxy-2-methylpropyl)-benzamide (XXIV)

To 89.1 g. (1.0 mole) of commercial isobutanolamine in a 1-l. round-bottomed flask was added 122.1 g. (1.0 mole) of benzoic acid. After the initial exothermic reaction had subsided, the flask was immersed in an oil bath at 115° and heated to 135° in twenty minutes. After two hours, the clear, yellow reaction mixture was poured from the flask and allowed to crystallize to a hard cake. Recrystallization from benzene yielded XXIV as 146.6 g. (76%) of large colorless plates, M. P. 103.5–105.8°. A portion recrystallized from benzene for analysis melted at 105.5–107.0°.

Analysis.—Calculated for $C_{11}H_5NO_2$:

|   | Calculated | Found |
|---|---|---|
| C | 68.37 | 68.68 |
| H | 7.82 | 7.87 |
| N | 7.25 | 7.25 |

EXAMPLE XV 5,5-dimethyl-2-phenyl-2-thiazoline (XXV)

An intimate mixture of 145.0 g. (0.75 mole) of N-(2-hydroxy-2-methylpropyl)-benzamide and 63.7 g. (0.30 mole) of phosphorus pentasulfide was heated with a free flame till fusion was complete and no further gas appeared to be evolved. The black fluid supernatant layer was decanted, and the resinous residue was leached with 180 ml. of N potassium hydroxide solution and 60 ml. of ether over the course of one hour. The basic layer was separated, and again extracted with three 25-ml. portions of ether. The combined ether layers were dried by twice decanting from potassium hydroxide followed by potassium carbonate. The concentrated ether extract and the original supernatant layer were combined and distilled, B. P. 139° (4 mm.), $n_D^{25}$ 1.5698, yield of XXV, 59.56 g. (41.2%). After redistillation the material had the following properties: $n_D^{25}$ 1.5708; B. P. 116° (2.4 mm.). A picrate was prepared, M. P. 159.5–160.5°.

Analysis.—Calculated for $C_{17}H_{16}N_4O_7S$:

|   | Calculated | Found |
|---|---|---|
| C | 48.57 | 48.83 |
| H | 3.83 | 4.03 |
| N | 13.33 | 13.26 |

EXAMPLE XVI 5,5-dimethyl-2-phenyl-α-succinimido-2-thiazolidineacetic acid β-lactam (XXVI)

To a rapidly stirred solution of 1.91 g. (0.01 mole) of 5,5-dimethyl-2-phenyl-2-thiazoline (XXV) and 1.86 g. (0.01 mole) of succinimidoacetyl chloride (XVIII) in 35 ml. of methylene chloride at reflux was added through a high dilution cycle a solution of 1.02 g. (0.01 mole) of triethylamine in 50 ml. of methylene chloride over a ten hour period. Concentration of the solution and extraction of the residue with 50 ml. of benzene yielded 1.67 g. (slightly more than the theoretical amount) of triethylamine hydrochloride. The filtrate was concentrated to a slowly crystallizing red oil, which yielded 0.89 g. (27%) of crude XXVI, M. P. 150–169°, on trituration with three 10-ml. portions of 50% ethanol. Recrystallization from acetone-cyclohexane yielded 0.51 g. (15.5%) of the β-lactam XXVI, M. P. 181.0–193.0°. An analytical sample crystallized from the same solvent pair melted at 183.5–184.0°.

Analysis.—Calculated for $C_{17}H_{18}N_2O_3S$:

|   | Calculated | Found |
|---|---|---|
| C | 61.80 | 61.68 |
| H | 5.49 | 5.33 |
| N | 8.48 | 8.45 |

EXAMPLE XVII 5,5-dimethyl-2-phenyl-α-phthalimido-2-thiazolodine-acetic acid β-lactam (XXVII)

To a rapidly stirred solution of 1.91 g. (0.01 mole) of 5,5-dimethyl-2-thiazoline (XXV) and 2.24 g. (0.01 mole) of phthalimidoacetyl chloride in 50 ml. of ether at reflux was added through a high dilution cycle 1.40 m. (1.02 g., 0.01 mole) of triethylamine in 25 ml. of ether over a one and three-quarter hour period. The red solution was filtered and the collected tan solid, wt. 2.49 g., was digested with two 20-ml. portions of water. The loss of weight was 1.27 g., or 92.5% of the theoretical triethylamine hydrochloride. The residue, which amounted to 1.22 g., M. P. 190–213°, yielded no fraction which could be identified as lactam and was not further examined.

The original ether filtrate after concentration crystallized in part on standing, and after trituration with small portions of ether yielded 0.480 g. (12.7%) of crude lactam fraction, M. P. 200.0–205.0°. A 0.300 mg. portion was extracted with acetone and diluted with water, yielding 0.120 g. (5%) of pure XXVII, M. P. 215.0–216.2°. An analytical sample obtained from acetone-water melted at 213.0–215.0°.

Analysis.—Calculated for $C_{21}H_{18}N_2O_3S$:

|   | Calculated | Found |
|---|---|---|
| C | 66.65 | 66.58 |
| H | 4.79 | 4.85 |
| N | 7.40 | 7.40 |

EXAMPLE XVIII 4-carbomethoxy - 5,5 - dimethyl - 2 - phenyl - α - succinimido-2-thiazolidineacetic acid β-lactam (XXIX)

To a solution of 2.50 g. (0.01 mole) of 5,5-dimethyl-2-phenyl-2-thiazoline-4-carboxylate, methyl ester (XXVIII) in 10 ml. of methylene chloride in a 200-ml. three-necked flask was added 25 ml. of methylene chloride and 1.85 g. (0.01 mole) of succinimidoacetyl chloride (XVIII). To this rapidly stirred solution at reflux was added through a high-dilution cycle a solution of 1.02 g. (0.01 mole) of triethylamine in 50 ml. of methylene chloride over a six and one-quarter hour period. The concentrated reaction mixture was extracted with 50 ml. of benzene in three portions. The combined residue, collected by filtration, amounted to 1.85 g. The concentrated benzene filtrate crystallized spontaneously on standing, and on trituration with 40 ml. of 50% ethanol-water in two portions yielded 0.510 g. (13.1%) of nearly pure lactam, M. P. 183.0–184.5°. Recrystallization from acetone-cyclohexane containing a few drops of acetic anhydride yielded the purified lactam XXIX, M. P. 186.8–187.4°, which apparently contained one-half mole of cyclohexane of crystallization.

*Analysis.*—Calculated for $C_{15}H_{20}N_2O_5S \cdot \frac{1}{2}C_6H_{12}$:

|   | Calculated | Found |
|---|---|---|
| C | 61.38 | 61.17 |
| H | 5.90 | 6.12 |
| N | 6.51 | 6.42 |

EXAMPLE XIX

*Sulfone of 4-carbomethoxy-5,5-dimethyl-2-phenyl-α-succinimido-2-thiazolidineacetic acid β-lactam (XXX)*

To a solution of 0.194 g. (0.0005 mole) of the lactam (XXIX) in 15 ml. of dioxane was added 0.213 g. of potassium permanganate dissolved in 3 ml. of water and 8 ml. of acetic acid. After forty minutes the brown solution was decolorized with several drops of 30% hydrogen peroxide and diluted with 75 ml. of water. After storage at 5° overnight, the fine, glistening platelets amounted to 0.172 g. (81.8%), M. P. 230.0° (dec.). An analytical sample recrystallized from acetone-petroleum ether (B. P. 30–60°) containing two drops of acetic anhydride melted at 233.8–234.2° with decomposition.

*Analysis.*—Calculated for $C_{19}H_{20}N_2O_5S$:

|   | Calculated | Found |
|---|---|---|
| C | 54.32 | 54.10 |
| H | 4.79 | 4.90 |
| N | 6.67 | 6.73 |

EXAMPLE XX

*Methyl 5-phenyl-(2-carbomethoxyethyl)-penicillinate (XXXI)*

A solution of 0.194 g. (0.0005 mole) of the lactam XXIX in 7 ml. of anhydrous dioxane was titrated slowly to a phenolphthalein end point with 4.66 ml. (0.0005 mole) of 0.1074 N sodium hydroxide solution. The solution was neutralized with 4.84 ml. (0.0005 mole) of 0.1034 N hydrochloric acid and then concentrated at 45° under reduced pressure. The residue was dissolved in 10 ml. of chloroform and an excess of diazomethane in ether was added. After fifteen minutes the excess diazomethane was decomposed with acetic acid and the solution was concentrated to a yellow oil under reduced pressure. Solution in 2 ml. of acetone and dilution with 15 ml. of petroleum ether (B. P. 30–60°) yielded 0.015 g. of a crystalline precipitate, M. P. 160–170°, which was filtered from the solution and rejected. The filtrate was concentrated to dryness, triturated with petroleum ether, and then taken up in 5 ml. of cyclohexane containing just sufficient acetone for solution. Dilution with 15 ml. of petroleum ether yielded the desired ester XXXI in two crops as 0.060 g. (28.6%) of small prisms, M. P. 126.6–129.0°. Recrystallization from acetone-petroleum ether yielded an analytical sample, M. P. 131.0–132.2°.

*Analysis.*—Calculated for $C_{20}H_{24}N_2O_6S$:

|   | Calculated | Found |
|---|---|---|
| C | 57.13 | 57.02 |
| H | 5.75 | 5.68 |
| N | 6.66 | 6.60 |

EXAMPLE XXI

*Degradation of the lactam XXIX*

A solution of 0.200 g. of the lactam XXIX in 10 ml. of N sodium hydroxide and 10 ml. of dioxane was refluxed for two hours. The solvent mixture was distilled under reduced pressure and the yellow, oily residue taken up in 20 ml. of water. The aqueous solution was acidified to pH 3 with 10 ml. of N hydrochloric acid and then reconcentrated to dryness. The salts were separated by filtration of a solution of the residue in 10 ml. of 95% ethanol. The filtrate was treated with 0.400 g. of 2,4-dinitrophenyl-hydrazine dissolved in 2 ml. of concentrated sulfuric acid and 3 ml. of water. On dilution of the resulting solution with 8 ml. of water, an immediate precipitate resulted, which was separated by filtration after 30 minutes. The crystalline product amounted to 0.065 g. (30%), M. P. 179.2–181.6°. A portion recrystallized from ethyl acetate-carbon tetrachloride melted at 185.8–186.9°.

*Analysis.*—Calculated for $C_{12}H_{17}N_5O_7$:

|   | Calculated | Found |
|---|---|---|
| C | 52.05 | 51.98 |
| H | 4.13 | 4.36 |

The melting point on admixture with an authentic synthetic sample of XXXII, prepared as described below, was not depressed.

EXAMPLE XXII

*N-phenacylsuccinamic acid 2,4-dinitrophenylhydrazone*

N-phenacylsuccinimide was prepared in 71% yield from succinimidoacetyl chloride and benzene in the presence of aluminum chloride, M. P. (uncorr.) 143–144°.

A suspension of 0.205 g. of N-phenacylsuccinimide in 2 ml. of N sodium hydroxide was warmed a few minutes to effect complete solution. After several additional minutes at 85°, the solution was diluted with 2 ml. of water and acidified with 2.2 ml. of N hydrochloric acid. In about thirty seconds a voluminous mass of colorless crystals appeared (presumably N-phenacylsuccinamic acid).

The addition of 2 ml. of alcohol and reheating the suspension to 85° gave a clear solution, which was treated with a solution of 0.200 g. of 2,4-dinitrophenylhydrazine in 1 ml. of sulfuric acid, 1.5 ml. of water and 5 ml. of ethanol. After one hour the crystalline precipitate was collected by filtration and washed with 50% ethanol, weight 0.290 g. (66%); M. P. 185–186°. Recrystallization from ethyl acetate-carbon tetrachloride raised the M. P. to 186.4–187.3°.

*Analysis.*—Calculated for $C_{18}H_{17}N_5O_7$:

|   | Calculated | Found |
|---|---|---|
| C | 52.05 | 51.69 |
| H | 4.13 | 4.24 |
| N | 16.86 | 16.72 |

Triethylamine is preferred but other basic tertiary amines may be used provided only that they be free of primary or secondary amines. Examples are tripropylamine, trimethylamine, pyridine, quinoline and N,N-dimethylaniline.

Modifications may be made in carrying out the present invention without departing from the spirit or scope thereof, and the invention is limited only by the appended claims.

I claim:

1. A compound of the general formula $$\begin{array}{c} R_4\ R_5 \\ | \ \ | \\ R_3-C-C-H \\ \diagdown\ \ \ | \\ S\ \ \ | \\ \diagdown\ \ \ | \\ R_2-C-N \\ | \ \ \ \ | \\ HC-C=O \\ | \\ R_1 \end{array}$$

wherein $R_1$ represents a member selected from the group consisting of phthalimido, 3-nitrophthalimido, succinimido, and di-(methanesulfonyl)amino; $R_2$ represents a member selected from the group consisting of hydrogen and phenyl; $R_3$ and $R_4$ each represent a member selected from the group consisting of lower alkyl and hydrogen and R₃ and R₄ are alike; and R₅ represents a member selected from the group consisting of hydrogen, carboxy and (lower) carbalkoxy.

2. The compound

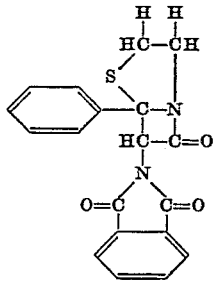

2-phenyl-α-phthalimido-2-thiazolidineacetic acid β-lactam.

3. The compound

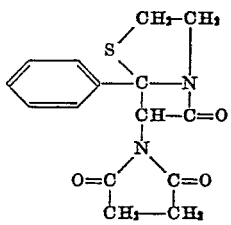

4. The compound

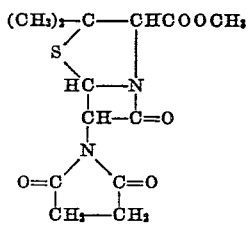

5. The compound

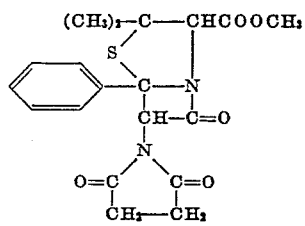

6. The compound

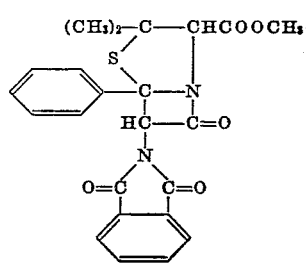

7. The compound

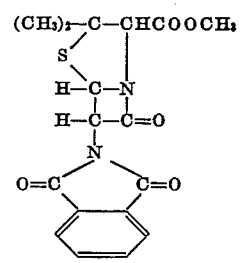

8. A process for the preparation of bicyclic β-lactams which comprises the interaction substantially in the range of 0° C. to 100° C. of at least one molecular equivalent of a basic tertiary amine bearing no functional groups, a halide selected from the group consisting of phthalylglycyl chloride, 3-nitrophthalylglycyl chloride, succinimidoacetyl chloride and dimethanesulfonylaminoacetyl chloride, and a 2-thiazoline in an amount substantially equivalent to the amount of halide used on a molecular basis and having the formula

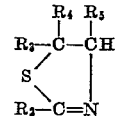

wherein R₂ represents a member selected from the group consisting of hydrogen and phenyl; R₃ and R₄ each represent a member selected from the group consisting of lower alkyl and hydrogen and R₃ and R₄ are alike; and R₅ represents a member selected from the group consisting of hydrogen, carboxy and (lower) carbalkoxy.

9. A process according to claim 8 where the 2-thiazoline is 2-phenyl-2-thiazoline.

10. A process according to claim 8 where the 2-thiazoline is methyl 5,5-dimethyl-2-phenyl-2-thiazoline-4-carboxylate.

11. A process according to claim 8 where the halide is phthalylglycyl chloride.

12. A process according to claim 8 where the halide is succinylglycyl chloride.

13. A process according to claim 8 where the 2-thiazoline is methyl 5,5-dimethyl-2-thiazoline-4-carboxylate.

14. A process according to claim 8 where the acyl halide is N,N-dimethanesulfonylglycyl chloride.

15. A process according to claim 9 where the basic tertiary amine is triethylamine.

16. A process according to claim 10 where the basic tertiary amine is triethylamine.

References Cited in the file of this patent

UNITED STATES PATENTS 2,479,295    Behrens et al. _____ Aug. 16, 1949

OTHER REFERENCES

Behrens et al.: J. Biol. Chem., vol. 175, September 1948, pp. 783, 785.
Abbott Report CMR–A25, September 15, 1945, page 2.
Cutter Report CMR–Cu–7, July 1, 1945, pp. 1–5.
Lilly Report CMR–L–30, October 31, 1945, pp. 1–3.
Sheehan et al.: "J. Am. Chem. Soc." vol. 72, August 1950, pp. 3828–9.
Sheehan et al.: "J. Am. Chem. Soc.," vol. 73, March 1941, pp. 1204–6.
Sheehan et al.: "J. Am. Chem. Soc.," vol. 73, October 1951, pp. 4752–9.